(12) United States Patent
Robinson et al.

(10) Patent No.: US 11,329,940 B2
(45) Date of Patent: May 10, 2022

(54) COORDINATED UNREAD COUNT FOR EMAIL APPLICATIONS

(71) Applicant: Microsoft Technology Licensing, LLC, Redmond, WA (US)

(72) Inventors: Joshua Travis Robinson, Woodinville, WA (US); Shawn Michael Temming, Seattle, WA (US); Jonathan Yoder Brenner, Seattle, WA (US); Matthew Carey Eckstein, Madrid (ES); Rikinkumar Ashwin Shah, Sammamish, WA (US); Konrad Daniel Lindenbach, Redmond, WA (US); Galen Michael Elias, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/666,110

(22) Filed: Oct. 28, 2019

(65) Prior Publication Data

US 2021/0126886 A1    Apr. 29, 2021

(51) Int. Cl.
*H04L 51/42* (2022.01)
*H04L 51/58* (2022.01)
*G06Q 10/10* (2012.01)

(52) U.S. Cl.
CPC .............. *H04L 51/22* (2013.01); *H04L 51/38* (2013.01)

(58) Field of Classification Search
CPC ........ H04L 51/22; H04L 51/38; G06Q 10/107
See application file for complete search history.

(56) References Cited

U.S. PATENT DOCUMENTS 7,290,034 B2    10/2007 Budd et al.
7,673,002 B1     3/2010 Damarla
(Continued)

FOREIGN PATENT DOCUMENTS

WO    2015145225 A2    10/2015

OTHER PUBLICATIONS

"How to fix the wrong number of unread emails flag in Outlook?", Retrieved from: https://superuser.com/questions/577858/how-to-fix-the-wrong-number-of-unread-emails-flag-in-outlook, Retrieved Date: Sep. 12, 2019, 5 Pages.
(Continued)

*Primary Examiner* — Shirley X Zhang
(74) *Attorney, Agent, or Firm* — Ray Quinney & Nebeker; Adam K. Richards; Anand Gupta

(57) ABSTRACT

The disclosure concerns tracking a total count of unread messages where an email service manages email messages and a subset of the email messages are also stored locally on a client device. The client device may maintain a local unread count of unread messages stored on the client device, and the email service may maintain a remote unread count of unread messages stored on the email service but not on the client device. The email service may provide the remote unread count to the client device, and the client device may determine the total unread count by adding the local unread count to the remote unread count. The client device may also provide an identifier to the email service, and the email service may use the identifier to determine which of the email messages stored on the email service are not stored on the client device.

17 Claims, 7 Drawing Sheets

(56) References Cited

U.S. PATENT DOCUMENTS

| | | |
|---|---|---|
| 8,135,784 B2 | 3/2012 | Oishi |
| 8,291,347 B2 | 10/2012 | Booking |
| 8,730,912 B2 | 5/2014 | Drapkin et al. |
| 8,745,161 B2 | 6/2014 | Darnell et al. |
| 10,057,152 B2 | 8/2018 | Bengochea et al. |
| 10,277,549 B2* | 4/2019 | Jhaveri ............... H04L 67/2842 |
| 2004/0133644 A1 | 7/2004 | Warren et al. |
| 2007/0198677 A1* | 8/2007 | Ozhan .................. G06Q 10/107 709/223 |
| 2010/0100590 A1 | 4/2010 | Palay et al. |
| 2013/0159389 A1* | 6/2013 | Mahood ............... G06Q 10/107 709/203 |
| 2013/0185649 A1* | 7/2013 | Mahood ............... G06Q 10/107 715/752 |
| 2016/0057042 A1* | 2/2016 | Bengochea ............. H04L 51/24 455/412.2 |
| 2016/0323227 A1 | 11/2016 | Avdienkov et al. |

OTHER PUBLICATIONS

Delic, Josip, "Implement unread messages in the server", Retrieved from: https://github.com/matrix-org/synapse/issues/2632, Nov. 3, 2017, 2 Pages.

"International Search Report and Written Opinion Issued in PCT Application No. PCT/US20/055298", dated Dec. 9, 2020, 11 Pages.

* cited by examiner

COORDINATED UNREAD COUNT FOR EMAIL APPLICATIONS

CROSS-REFERENCE TO RELATED APPLICATIONS

N/A

BACKGROUND

Individuals use computing devices (such as mobile phones and personal computers) to perform a variety of different tasks. For example, individuals can use computing devices to communicate with each other using voice calls, video conferencing, electronic messaging systems (e.g., email, texting, and instant messaging systems), social networking systems, and collaboration systems. Email systems may allow individuals to compose, send, receive, view, and organize email messages. The email system may organize email messages into folders.

An email system may include an email service. The email service may store copies of email messages. A user may be able to access the email service and view email messages using a web browser. The user may also be able to access the email service and view email messages using an email application stored on a computing device. The email application may store local copies of the email messages that are stored on the email service.

SUMMARY

In accordance with one aspect of the present disclosure, a computer-readable medium is disclosed. The computer-readable medium includes instructions that are executable by one or more processors to cause a computing system to determine a local count of local unread messages. At least a portion of each of the local unread messages is stored on a client device. The computer-readable medium also includes instructions that are executable by the one or more processors to cause the computing system to receive a remote count of remote unread messages. The remote unread messages are not stored on the client device. The computer-readable medium also includes instructions that are executable by the one or more processors to cause the computing system to calculate a total count of unread messages. The total count includes the local count added to the remote count. The computer-readable medium also includes instructions that are executable by the one or more processors to cause the computing system to enable display of the total count of unread messages on a display screen of the client device.

The remote unread messages may be stored on an email service and the remote count may be received from the email service.

The computer-readable medium may further include additional instructions that are executable by the one or more processors to cause the computing system to provide to an email service an identifier for distinguishing the local unread messages from the remote unread messages. The email service may include the local unread messages and the remote unread messages.

The remote count may be received from the email service and the remote count may be received after the identifier is provided to the email service.

The identifier may be a bottom timestamp. The client device may not store messages older than the bottom timestamp.

The identifier may be a message count. The client device may store no more than a number of messages equal to the message count.

The computer-readable medium may further include additional instructions that are executable by the one or more processors to cause the computing system to request from the email service new messages and receive a new message from the email service. The new message may be marked as unread. The computer-readable medium may further include additional instructions that are executable by the one or more processors to update the local count of local unread messages based on receiving the new message.

The computer-readable medium may further include additional instructions that are executable by the one or more processors to cause the computing system to request from the email service status update information for the local unread messages. The local unread messages stored on the client device may include a first message, and the email service may include the local unread messages and the first message. The computer-readable medium may further include additional instructions that are executable by the one or more processors to cause the computing system to receive from the email service the status update information for the local unread messages. The status update information may state that the first message is marked as read on the email service. The computer-readable medium may further include additional instructions that are executable by the one or more processors to cause the computing system to update the local count of local unread messages based on marking the first message as read.

The computer-readable medium may further include additional instructions that are executable by the one or more processors to cause the computing system to receive an update to the remote count of remote unread messages and update the total count of unread messages based on the update.

The update to the remote count of remote unread messages may result from a request to the email service to mark as read a first message included in the remote unread messages.

The computer-readable medium may further include additional instructions that are executable by the one or more processors to cause the computing system to receive a request to mark as read a first message included in the local unread messages and update the local count of local unread messages and the total count of unread messages based on the request.

The local unread messages may be associated with a folder and the remote unread messages may be associated with the folder.

In accordance with another aspect of the present disclosure, a computer-readable medium is disclosed. The computer-readable medium includes instructions that are executable by one or more processors to cause a computing system to determine a local count of unread messages included in local messages. The at least a portion of each of the local messages are stored on a client device. The computer-readable medium also includes instructions that are executable by the one or more processors to cause the computing system to receive, from a service, a remote count of unread messages included in remote messages. The service includes the local messages and the remote messages and the client device does not include the remote messages. The computer-readable medium also includes instructions that are executable by the one or more processors to cause the computing system to calculate a total count of unread messages. The total count includes the local count added to the remote count. The computer-readable medium also includes instructions that are executable by the one or more processors to cause the computing system to enable display of the total count of unread messages on a display screen of the client device.

The local messages may be associated with a folder and the remote messages may be associated with the folder.

The remote messages may fall outside a synchronization window and the local messages may fall within the synchronization window.

The computer-readable medium may further include additional instructions that are executable by the one or more processors to cause the computing system to receive a request to change a read/unread status of a first message included in the local messages, change the read/unread status of the first message, and update the local count of unread messages and the total count of unread messages based on the change to the read/unread status of the first message.

In accordance with another aspect of the present disclosure, a method is disclosed for providing a count of unread messages. The method includes storing a set of messages associated with a folder. Each message in the set of messages includes a read/unread status. The method further includes identifying a set of remote messages from the set of messages. The set of remote messages are not stored on a client device. The method further includes determining the count of unread messages included in the set of remote messages and providing the count of unread messages to the client device.

The method may further include receiving a request to change a first read/unread status of a first message included in the set of messages. The first message may also be stored on the client device. The method may further include waiting to provide an update on the first read/unread status of the first message until receiving a request from the client device.

The method may further include receiving a request to change a first read/unread status of a first message included in the set of remote messages, determining an updated count of unread messages included in the set of remote messages based on the request, and providing the updated count of unread messages to the client device.

The updated count of unread messages may be provided to the client device without waiting for a client request from the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
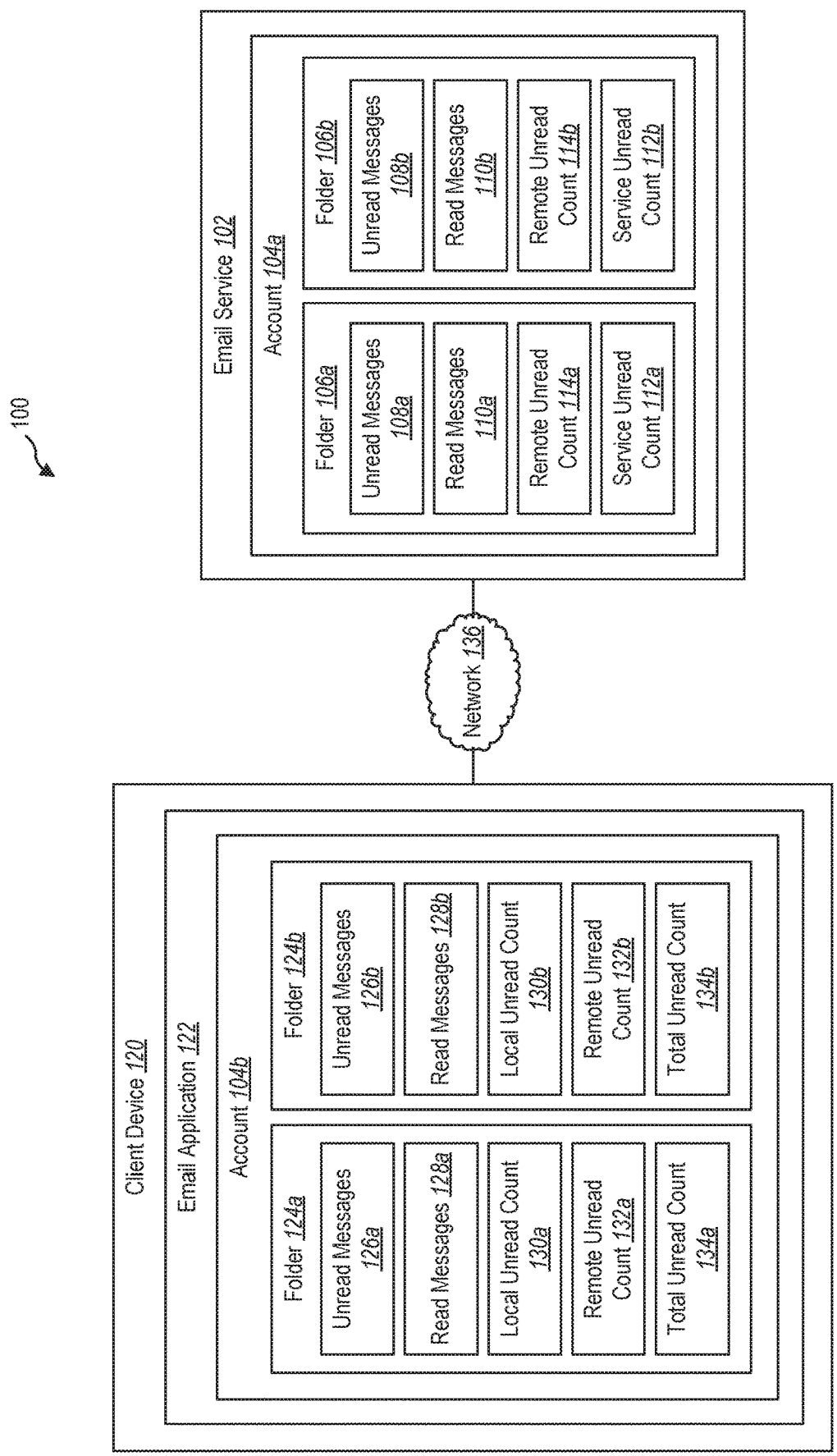
FIG. 1 illustrates an example of a potential system for determining a total unread count for a folder associated with an account managed by an email service.

Electronic messaging systems (including email) have become an integral part of business and personal communication. An electronic messaging system may include an email service that client devices (such as smartphones, tablets, laptops, and desktops) can access through a network, such as the internet. The client devices may access the email service using a locally stored email application or through a web interface using an internet browser.

The email service may be a collection of hardware and software that manages email messages associated with a plurality of email accounts. Each email account may be associated with one or more email addresses and may require authentication information (such as a password) to access. A user may access email messages associated with an email account through a web interface or through use of an email application.

The email messages associated with each email account may be organized into folders. For example, each email account may include an "Inbox" folder that contains copies of messages sent to the account and a "Sent Mail" folder that contains copies of messages sent from the account. When the email service receives an email message sent to the account, the email service may store a copy of that email message in the "Inbox" associated with the account. And when the email service receives an email message sent from the account to an email recipient, the email service may store a copy of the email message in the "Sent Mail" folder associated with the account and then send the email message to the email recipient. In some designs, a single folder may hold all email associated with an email account.

Each email message may include content (such as text or images) and may be marked as unread or read. An email message may be marked as unread (or have an unread status) because the email message has not yet been viewed. The email message may also be marked as unread because even though the email message has been viewed, a user requested that the email message be marked as unread. Email messages sent to the user and received by the email service may be initially designated as unread messages. An email message may be marked as read (or have a read status) because the email message has been viewed or because a user requested that the email message be marked as read.

When a user uses an email application on a client device to access an email account, the email application may download from the email service copies of email messages associated with the email account. The downloaded email messages may initially retain the same read/unread status as they had on the email service. The email application may indicate the read/unread status of an email message to the user. The email application may maintain a count of unread messages on the client device. The email application may also maintain, for each folder, a folder count of unread messages associated with the folder. The count of unread messages on the client device may help the user know how many email messages the user has yet to view.

The email application may allow the user to view the email messages downloaded to the client device. The email application may change the read/unread status of an email message when the user views the email message. The email application may update the count of unread messages on the client device when the user views an unread message.

Some email applications may download all the email messages stored on the email service that are associated with an account or a particular folder. In that situation, the count of unread messages on the client device may represent the total number of unread messages associated with the account (at least at the time the email application downloads email messages from the email service). And the folder count of unread messages represents the total number of unread messages associated with the folder (at least at the time the email application downloads email messages associated with the folder).

In some situations, however, an email application may download fewer than all the email messages stored on the email service. For example, if the email application runs on a mobile device, it may be expensive (due to data transmission costs), time consuming (due to data download speeds), or impractical (due to storage constraints) to download all email messages stored on the email service. As another example, if the email application runs on a laptop or desktop computer, downloading all email messages stored on the email service may reduce application performance and responsiveness due to the large number and total size of email messages that may be stored on the email service. Furthermore, the email application may periodically synchronize information associated with downloaded emails with the email service. Synchronization may involve synchronizing the read/unread status of messages stored on the client device and on the email service. Synchronization may also involve communicating about whether a particular email message has been deleted from the client device or the email service. If the client device has a large number of emails stored locally, synchronization may slow performance of the email application.

When an email application downloads fewer than all available email messages, the email application may determine which email messages to download and/or sync on a folder-by-folder basis. The email application may use various methods to determine what new email messages and updates to email messages (such as changes to the read/unread status of email messages) to request from the email service. For example, the email application may maintain a bottom timestamp. When the email application requests new messages or updates from the email service, the email application may request all new email messages and all updates to email messages that have a timestamp more recent than the bottom timestamp. Thus, if the user has viewed a previously unread email message using a web interface and that email message has a timestamp that is more recent than the bottom timestamp, the email service may communicate the change in read/unread status of that email message to the email application. And if the email service has received a new message that is more recent than the bottom timestamp, the email service may provide that new message to the email application. On the other hand, if the user has modified the read/unread status of an email message with a timestamp older than the bottom timestamp, the email service may not indicate that change to the email application. As another example, the email application may maintain a count of the number of messages it wants to store locally. When the email application requests synchronization with the email service, the email application may request from the email service the most recent email messages up to the count and any updates to the most recent email messages up to the count.

When the client device stores fewer than all the email messages stored on the service, the count of unread messages stored on the client device may not include all the unread messages associated with the user's account (or in a specific folder in the user's account). For example, there may be unread messages associated with the user's account that are stored on the email service but are not stored on the client device because the unread messages are older than the bottom timestamp or do not fall within the count.

When the client device stores fewer than all the email messages stored on the service, a count of unread messages present on the email service may not include updates to the read/unread status of messages stored locally on the client device. For example, if the client device receives from the email service a count of all unread messages stored on the email service, the count may not reflect that the user has viewed several previously unread email messages using the email application. Or the client device may receive from the email service a count of all unread messages stored on the email service but may not be able to sync with the email service for a period of time. If the client device relies solely on the unread count provided by the email service, the client device may not update the unread count until it syncs with the email service. Thus, when the user uses the email application to view email messages stored locally, the unread count may not reflect that activity.

The systems and methods described herein may more allow the client device to provide a more accurate count of unread messages associated with the user's account in situations where a client device does not download all the email messages present on an email service. The client device may maintain a local unread count for messages it has stored locally. The email service may maintain a remote unread count for messages the email service has that the client device does not have locally. The email service may communicate the remote unread count to the client device. The client device may determine a total unread count by adding the local unread count to the remote unread count. The client device may provide an identifier to the email service, and the email service may use the identifier to determine which of the email messages stored on the email service are not stored on the client device.

The client device may update the local count (and thus the total count) as the user views unread messages stored on the client device. The client device may also receive updates to the remote count (and thus update the total count) when the email service learns that unread messages stored on the email service but not the client device have been viewed.

The email service may update the client device on changes to the read/unread status of messages stored on the email service that are also stored on the client device. The client device may then update the local count (and thus the total count) based on the status updates received from the email service. The client device may update the local count when it receives new unread messages from the email service.

The systems and methods described herein may improve the use of email applications and the client devices that store the email applications. Email applications may display an unread message count to a user. Displaying on a client device a total unread count that includes both a local unread count and a remote unread count may make unread counts displayed across different client devices and on a web interface more consistent. Displaying on a client device a total unread count that includes both a local unread count and a remote unread count may allow the user to better determine whether the user has additional email messages to review. For example, an email application utilizing the systems and methods described herein may display an unread message count of five. Assume for purposes of this example that three of the unread messages are stored locally and that two of the unread messages are stored on the email service but not the client device. A user may view the three unread messages available on the email application. At that point, the email application may show an unread message count of two. The displayed unread count may communicate to the user that the user has two unread messages stored remotely. The user may access those messages by scrolling down to prompt the email application to download additional messages, by hitting a soft-key that prompts the email application to download additional messages, by using a web interface to access additional messages, or by some other means.

FIG. 1 illustrates one potential example of a system 100 for determining a total unread count 134a for a folder 124a and total unread count 134b for a folder 124b. The system 100 may include an email service 102 and a client device 120. The email service 102 and the client device 120 may be connected (at least periodically) through a network 136. Although not shown in FIG. 1, devices other than the client device 120 may access the email service 102 through the network 136. For example, a second client device may include an email application that connects to the email service 102.

The email service 102 may be a collection of hardware and software designed to manage email messages. The email service 102 may manage email messages for multiple accounts, including account 104a. Each account may be associated with one or more email addresses. When an email message is sent to or from the one or more email addresses associated with an account, the email service 102 may store a copy of the email message and associate it with the account. The email service 102 may include one or more storage devices capable of storing copies of email messages. Accessing email messages associated with the account 104a may require use of authentication information, such as a password. A user may be able to view email messages associated with the account 104a through a web interface using an internet browser or through client devices (such as smartphones, laptops, tablets, and desktop computers) using an application.

Email messages associated with the account 104a may be organized into folders, such as folder 106a and folder 106b. The folder 106a may contain a first set of email messages and the folder 106b may contain a second set of email messages. The first set of email messages may not have any overlap with the second set of email messages. In some cases, the folder 106b may be a subfolder of the folder 106a. For example, the folder 106a may be a generic "Inbox" folder for messages sent to the account 104a, and the folder 106b may be a folder for messages sent to the account 104a from a particular sender. In the alternative, the folder 106b may not be a subfolder of the folder 106a. For example, the folder 106a may be a generic "Inbox" folder, and the folder 106b may be a "Junk Mail" folder. Although FIG. 1 shows the account 104a organized into the folder 106a and the folder 106b, in other designs an account may be organized into more than two folders or may include only a single folder that holds messages associated with the account.

The first set of email messages included in the folder 106a may include unread messages 108a and read messages 110a. Every email message included in the first set of email messages may be included in either the unread messages 108a or the read messages 110a. Email messages included in the unread messages 108a may not be included in the read messages 110a. Similarly, email messages included in the read messages 110a may not be included in the unread messages 108a.

The second set of email messages included in the folder 106b may include unread messages 108b and read messages 110b. Every email message included in the second set of email messages may be included in either the unread messages 108b or the read messages 110b. Email messages included in the unread messages 108b may not be included in the read messages 110b. Similarly, email messages included in the read messages 110b may not be included in the unread messages 108b.

Email messages included in the unread messages 108a, 108b may be email messages that have an unread status or are marked as unread. Having an unread status or being marked as unread may indicate that an email message has not yet been viewed or opened. An email message may also have an unread status or be marked as unread because a user, after viewing or opening the message, affirmatively requested that the email message be designated as unread or be marked as unread. The email service 102 may update a read/unread status of an email message based on a user viewing a message through a web interface. The email service 102 may also update the read/unread status of an email message when it receives information from a client device (such as the client device 120) that the email message has been viewed on the client device.

When a user accesses the account 104a through a web interface, the email service 102 may visually distinguish the unread messages 108a, 108b from the read messages 110a, 110b. For example, when accessed through a web interface, the email service 102 may display summary information for each email message in the folder 106a. The email service 102 may display summary information associated with the unread messages 108a against a white background and summary information associated with the read messages 110a against a grey background.

The email service 102 may maintain a service unread count 112a for the folder 106a and a service unread count 112b for the folder 106b. The service unread count 112a may be a count of the number of unread messages 108a included in the folder 106a. The service unread count 112b may be a count of the number of unread messages 108b included in the folder 106b. For example, if the folder 106a is the Inbox for the account 104a and there are 35 messages included in the unread messages 108a, the service unread count 112a for the folder 106a may have a value of 35. The email service 102 may update the service unread counts 112a, 112b when the read/unread status of the unread messages 108a, 108b or the read messages 110a, 110b change. For example, if a user accesses the account 104a through a web interface and views one of the unread messages 108a, the service unread count 112a may be updated to a value of 34.

The email service 102 may maintain or periodically determine a remote unread count 114a for the folder 106a and a remote unread count 114b for the folder 106b. The remote unread count 114a may be a count of the number of unread messages 108a included in the folder 106a that are not stored on the client device 120. The remote unread count 114b may be a count of the number of unread messages 108b included in the folder 106b that are not stored on the client device 120. For example, if the folder 106a includes 35 email messages that are marked as unread and 25 of those email messages are also stored on the client device 120, the remote unread count 114a may be 10. The email service 102 may calculate or update the remote unread counts 114a, 114b when the client device 120 requests the remote unread counts 114a, 114b, when the client device 120 requests new messages or status updates from the email service 102, or when there are updates to the read/unread status of email messages that are not stored on the client device 120 but are contained in the folders 106a, 106b.

The client device 120 may be any computing device. The client device 120 may include an email application 122. The email application 122 may be a program for managing email messages. The email application 122 may communicate with the email service 102 through the network 136. The email application 122 may receive copies of email messages from the email service 102. The email application 122 may allow a user to view downloaded email messages and compose and send email messages through the email service 102.

The email application 122 may manage email messages for multiple accounts, including account 104b. Each account may be associated with one or more email addresses. The client device 120 may include one or more storage devices capable of storing copies of email messages. Using the email application 122 to access email messages associated with the account 104b may require use of authentication information, such as a password. The account 104b and the account 104a may be the same. In other words, the email addresses associated with and the authentication information for the account 104a and the account 104b may be the same. Nevertheless, the information stored on the client device 120 that is associated with the account 104b may not be identical to the information stored on the email service 102 that is associated with the account 104a. That may be because the email application 122 does not download all the email messages stored on the email service 102 that are associated with the account 104a. It may be because the user performs actions in connection with the account 104b (such as using the client device 120 to view a message included in the unread messages 126a) that are not immediately communicated to the email service 102. It may be because the user performs actions in connection with the account 104a (such as using a web interface to view a message included in the unread messages 108a) that are not immediately communicated to the client device 120.

Email messages associated with the account 104b may be organized into folders, such as the folder 124a and the folder 124b. The folder 124a may contain a first set of email messages, and the folder 124b may contain a second set of email messages. The first set of email messages may not have any overlap with the second set of email messages. In some situations, the folder 124b may be considered a subfolder of the folder 124a. In situations in which the account 104a and the account 104b are the same, the folder 124a may be based on the folder 106a, and the folder 124b may be based on the folder 106b. For example, the first set of email messages in the folder 124a may be copies of email messages contained in the folder 106a on the email service 102. The second set of email messages in the folder 124b may also be copies of email messages contained in the folder 106b on the email service 102. And all the email messages on the client device 120 may be copies of email messages contained on the email service 102. But it may be that the client device 120 contains fewer than all the email messages contained on the email service 102. It may also be that modifications to email messages on the email service 102 (such as deletion of an email message, changes to the read/unread status of an email message, or changes to the folder with which an email message is associated) may not be immediately reflected in corresponding copies of those email messages on the client device 120. Similarly, it may be that modifications to email messages on the client device 120 may not be immediately reflected in corresponding email messages on the email service 102.

The first set of email messages included in the folder 124a may include unread messages 126a and read messages 128a. Every email message included in the first set of email messages may be included in either the unread messages 126a or the read messages 128a. Email messages included in the unread messages 126a may not be included in the read messages 128a. Similarly, email messages included in the read messages 128a may not be included in the unread messages 126a.

The second set of email messages included in the folder 124b may include unread messages 126b and read messages 128b. Every email message included in the second set of email messages may be included in either the unread messages 126b or the read messages 128b. Email messages included in the unread messages 126b may not be included in the read messages 128b. Similarly, email messages included in the read messages 128b may not be included in the unread messages 126b.

Email messages included in the unread messages 126a, 126b may be email messages that have an unread status or are marked as unread. Having an unread status or being marked as unread may indicate that an email message has not yet been viewed or opened. An email message may also have an unread status or be marked as unread because a user affirmatively designated the email message as unread or marked the email message as unread after viewing or opening the message. When a user accesses the account 104b using the email application 122, the email application 122 may visually distinguish the unread messages 126a, 126b from the read messages 128a, 128b. For example, the email application 122 may display summary information for each email message in the folder 124a. The email application 122 may display summary information associated with the unread messages 126a using bolded text and summary information associated with the read messages 128a using normal text.

The email application 122 may communicate with the email service 102 through the network 136 to synchronize information (i.e., to get information from the email service 102 and to provide information to the email service 102). The email application 122 may request or initiate synchronization. The email service 102 may synchronize with the email application 122 or provide notifications to the email application 122 without receiving a request. The email application 122 may provide some or all information stored on the email application as part of synchronization.

As part of the synchronization process, the email application 122 may receive from the email service 102 copies of email messages stored on the email service 102. The email messages may be messages received by the email service 102 since the last synchronization or messages that were stored on the email service 102 at the last synchronization but that were not provided to the client device 120 at that time.

The email application 122 may also receive updated information about email messages already stored on the client device 120. For example, the email application 122 may learn that an email message stored on the client device 120 has been deleted from the email service 102. In response, the email application 122 may delete the email message from the client device 120. As another example, the email application 122 may learn that an unread email message stored on the client device 120 has been marked as unread on the email service 102. In response, the email application 122 may mark the unread email message as read.

The email application 122 may provide updated information to the email service 102 about email messages stored on the client device 120 that are also stored on the email service 102. For example, the email application 122 may communicate to the email service 102 that certain email messages that were previously marked as unread have been viewed by the user and are now marked as read in the email application 122. The email service 102 may update the read/unread status of email messages based on information received from the email application 122. For example, if the email application 122 communicates that a certain email message on the client device 120 that was marked as unread is now marked as read, the email service 102 may mark that certain message as read on the email service 102.

The email application 122 may maintain or periodically determine a local unread count 130a for the folder 124a and a local unread count 130b for the folder 124b. The local unread count 130a may be a count of the number of unread messages 126a included in the folder 124a. The local unread count 130b may be a count of the number of unread messages 126b included in the folder 124b. For example, if the unread messages 126a include 10 email messages, the local unread count 130a for the folder 124a may be 10. The email application 122 may update the local unread counts 130a, 130b based on user activity. For example, if a user accesses the account 104b through the email application 122 and views one of the 10 email messages that are marked as unread, the local unread count 130a may be updated to a value of 9. In this way, the local unread count 130a may represent the number of email messages stored on the client device 120 and associated with the folder 124a that are marked as unread.

The local unread counts 130a, 130b may be different from the service unread counts 112a, 112b. For example, the unread messages 126a in the folder 124a on the email application 122 may all be included in the unread messages 108a in the folder 106a on the email service 102. But the unread messages 126a may not include all the unread messages 108a included in the folder 106a. In that case, the local unread count 130a may be less than the service unread count 112a. As another example, assume that there is initially exact overlap between the unread messages 126b and the unread messages 108b. Assume further that a user uses the email application 122 to view an email message included in the unread messages 126b. The email application 122 may mark the email message as read and update the local unread count 130b. But the email application 122 may not immediately communicate the change in status to the email service 102. As a result, the local unread count 130b may be less than the service unread count 112b for some period of time. As another example, assume that there is initially exact overlap between the unread messages 126a and the unread messages 108a. Assume further that a user uses a web interface to view an email message included in the unread messages 108a on the email service 102. The email service 102 may mark the email message as read and update the service unread count 112a. But the email service 102 may not immediately communicate that information to the email application 122. As a result, the service unread count 112a may be less than the local unread count 130a for some period of time.

The email application 122 may include a remote unread count 132a for the folder 124a and a remote unread count 132b for the folder 124b. The remote unread count 132a may be a count of the number of unread messages included in the folder 106a that are not stored on the client device 120. The remote unread count 132b may be a count of the number of unread messages included in the folder 106b that are not stored on the client device 120. The email application 122 may receive the remote unread counts 132a, 132b from the email service 102. The email application 122 may receive updates to the remote unread counts 132a, 132b upon request. The email application 122 may also receive updates to the remote unread counts 132a, 132b through notifications from the email service 102 without a request. For example, a user may access the account 104a using a web portal and change the read/unread status of an email message in the folder 106a. The email message may not be stored on the client device 120. In that situation, the email service 102 may update the remote unread count 114a and communicate that update to the email application 122 without waiting for a request. The email service 102 may update the remote unread count 114a immediately upon the change in the read/unread status of the email message. The email application 122 may update the remote unread count 132a based on the communication from the email service 102.

The email application 122 may include the total unread count 134a for the folder 124a and the total unread count 134b for the folder 124b. The email application 122 may calculate the total unread count 134a by summing the local unread count 130a and the remote unread count 132a. The email application 122 may update the total unread count 134a based on changes to the local unread count 130a or the remote unread count 132a. The total unread count 134a may represent a total number of unread messages associated with the folders 124a, 106a (regardless of whether the messages are stored on the client device 120), and the total unread count 134b may represent a total number of unread messages associated with the folders 124b, 106b (regardless of whether the messages are stored on the client device 120). The email application 122 may display the total unread counts 134a, 134b on a display screen of the client device 120.

Figure 2:
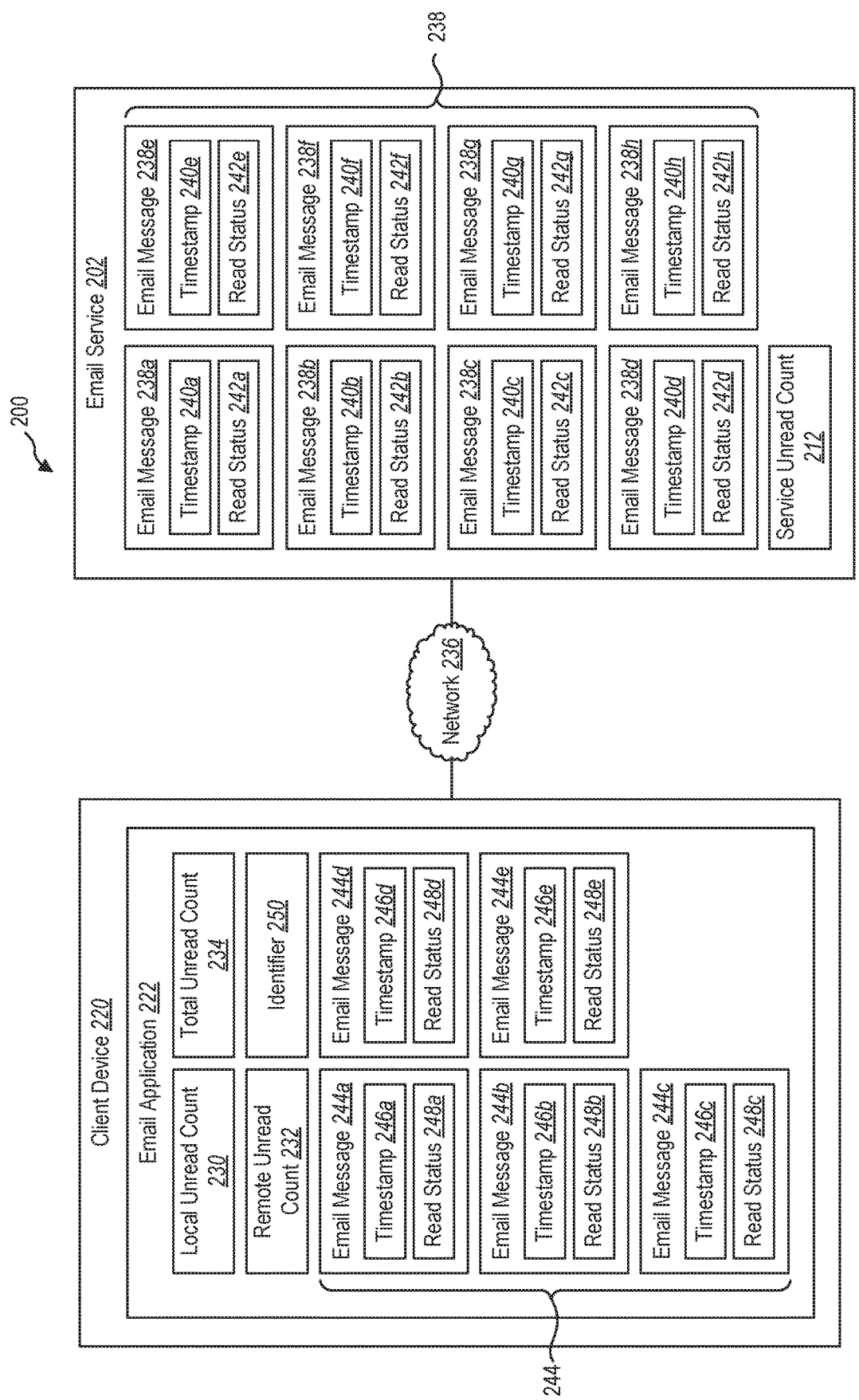
FIG. 2 illustrates an example of a potential system for determining a total unread count for email messages stored on a client device and on an email service.

FIG. 2 illustrates one potential example of a system 200 for determining a total unread count 234. The system 200 may include an email service 202, a client device 220, and a network 236.

The email service 202 may include email messages 238. The email messages 238 may be associated with an account and be contained within a folder in the account. The email messages 238 may include timestamps 240a-h and read statuses 242a-h. The timestamps 240a-h may indicate a date and a time each email message 238a-h was received by the email service 202. The timestamps 240*a-h* may allow the email service 202 to order the email messages 238 in chronological or reverse chronological order. The read statuses 242*a-h* may indicate whether the email messages 202 have been marked as read or marked as unread. The read statuses 242*a-h* may have either a "read" value or an "unread" value.

The email service may include a service unread count 212. The service unread count 212 may indicate how many of the email messages 238 are marked as unread. In other words, the service unread count 212 may indicate how many of the read statuses 242*a-h* have an "unread" value.

The email service 202 may provide copies of some or all the email messages 238 to an email application 222 on the client device 220. The email service 202 may provide copies of email messages to the email application 222 at particular intervals, upon receiving a new message, or upon receiving a request from the email application 222. The email service 202 may determine which of the email messages 238 to provide to the email application 222 based on the request from the email application 222. The email service 202 may determine which of the email messages 238 to provide to the email application 222 based on settings of the email service 202 or the email application 222. For example, the settings of the email application 222 may indicate that the email application 222 wants to store email messages for the most recent seven-day period. When the email application 222 requests email messages from the email service 202, the email application 222 may ask for any new email messages for the most recent seven-day period. In another example, the settings of the email application 222 may indicate that that the email application 222 wants to store all email messages on the email service 202. Thus, when the email application 222 requests email messages from the email service 202, the email application 222 may ask for any new email messages that are present on the email service 202.

The email service 202 may provide updates to the email application 222 regarding the read statuses of email messages stored on the client device 220. The timing of when the email service 202 provides these updates to the email application 222 may be based on the settings. For example, the email service 202 may provide updates to the email application 222 at defined periodic intervals, upon receiving a request from the email application 222, or upon detecting a read status change to an email message stored on the client device 220.

The email service 202 may receive updates from the email application 222 regarding the read statuses of email messages stored on the client device 220. The email application 222 may provide the updates at defined periodic intervals, upon receiving a request from the email service 202, or upon detecting a read status change to an email message stored on the client device 220.

The email application 222 may include email messages 244. The email application 222 may have received the email messages 244 from the email service 202. When received, email message 244*a* may have been a copy of email message 238*a*, email message 244*b* may have been a copy of email message 238*b*, email message 244*c* may have been a copy of email message 238*c*, email message 244*d* may have been a copy of email message 238*d*, and email message 244*e* may have been a copy of email message 238*e*. The email application 222 may have received the email messages 244 all at once or at different times. The email application 222 may have previously stored copies of the email messages 238*f-h*.

The email messages 244 on the email application 222 may include timestamps 246*a-e* and read statuses 248*a-e*. The timestamps 246*a-e* may indicate a date and a time each email message was received by the email service 202. The timestamps 246*a-e* may each have a unique value. The timestamps 246*a-e* of the email messages 244 may have the same values as the timestamps 240*a-e* of the email messages 238*a-e*. The read statuses 248*a-e* may indicate whether the email messages 244 have been marked as read or marked as unread. The read statuses 248*a-e* may have either an "unread" value or a "read" value. When the email application 222 receives an email message, such as the email message 244*a*, a read status 248*a* of the email message 244*a* may be the same as a read status 242*a* of the email message 238*a* on the email service 202. It may be, however, that a user can cause a change to the read status 248*a* of the email message 244*a* such that the read status 248*a* is different from the read status 242*a*. The email service 202 may update the read status 242*a* when the email service 202 receives the read status 248*a* from the email application 222.

The email application 222 may maintain or periodically determine a local unread count 230. The local unread count 230 may track how many of the email messages 244 are marked as unread (i.e., how many of the read statuses 248*a-e* have a "read" value). The email application 222 may update the local unread count 230 based on user activity and based on information received from the email service 202. For example, assume the read status 248*e* of the email message 244*e* has an "unread" value. Assume also that the user views the email message 244*e* using the email application 222, resulting in the read status 248*e* changing to a "read" value. The email application 222 may reduce the local unread count 230 by one as a result of this activity. As another example, assume at a time $t_0$ the client device 220 does not include the email message 244*a*. Assume that the client device 220 receives the email message 244*a* from the email service 202 at a time $t_1$. Assume that when the email application 222 receives the email message 244*a*, the read status 248*a* is unread. The email application 222 may increase the local unread count 230 by one at time $t_1$ (assuming the number of unread messages otherwise remains constant). As another example, assume that the email application 222 includes the email messages 244*a-e*. Assume that all the email messages 244*a-e* are marked as unread. Assume that upon syncing with the email service 202, the email application 222 ceases storing the email message 244*e* and does not receive any new email messages. The email application 222 may reduce the local unread count 230 by one. As another example, assume that the email application 222 includes the email messages 244*a-e*. Assume that all the email messages 244*a-e* are marked as unread. Assume that the email application 222 receives from the email service 202 an update to the read status 248*a* for the email message 244*a* such that the email application 222 changes the read status 248*a* to a "read" value. Assuming no other changes or updates, the email application 222 may reduce the local unread count 230 by one.

The email application 222 may include a remote unread count 232. The remote unread count 232 may indicate how many email messages that are on the email service 202 but not the client device 220 (such as the email messages 238*f-h*) are marked as unread. The email application 222 may receive the remote unread count 232 from the email service 202.

The email service 202 may provide the remote unread count 232 or updates to the remote unread count 232 upon receiving a request from the email application 222. For example, the email application 222 may request updates to the remote unread count 232 when the email application 222 requests new email messages and/or updates to the email messages 244. As another example, the email application 222 may request updates to the remote unread count 232 separate from and without requesting new email messages or other updates.

The email service 202 may provide updates to the remote unread count 232 without receiving a request from the email application 222. For example, the email service 202 may provide updates to the remote unread count 232 when changes to the read status of email messages not stored on the client device 220 (such as email message 238g) occur. In this example, if the read status 242g is changed from "unread" to "read," the email service 202 may update the service unread count 212 and determine an updated remote unread count. The email service 202 may then provide the updated remote unread count to the email application 222. The email application 222 may store the updated remote unread count as the remote unread count 232. As another example, the email service 202 may provide updates to the remote unread count 232 when the email service 202 receives new messages not stored on the client device 220. In this example, the email service 202 may adjust the service unread count 212 when the email service 202 receives a new message. The email service 202 may also determine an updated remote unread count that reflects a read status of the new message. The email service 202 may provide this updated remote unread count to the email application 222. As another example, the email service 202 may not provide updates to the remote unread count 232 when the email service 202 receives a new message but instead provide the new message when the email application 222 next syncs with the email service 202. At that time, a read status of the new message may be reflected in the local unread count 230. How the email service 202 accounts for new messages may depend on the synchronization and notifications settings of the email application 222 and the email service 202 or an identifier used by the email application 222.

The email application 222 may include a total unread count 234. The total unread count 234 may be a sum of the local unread count 230 and the remote unread count 232. The email application 222 may display the total unread count 234 on a display screen of the client device 220. The email application 222 may update the total unread count 234 based on changes to the local unread count 230 and the remote unread count 232.

The email application 222 may include an identifier 250. The email application 222 may provide the identifier 250 to the email service 202. The email service 202 may retain a copy of the identifier 250. The identifier 250 may include information that the email service 202 uses to determine which of the email messages 238 are stored on the email application 222. The email service 202 may also use the identifier 250 to determine what messages and updates to share with the email application 222. The email service 202 may store a copy of the identifier 250 when the email service 202 receives the identifier 250. The email service 202 may accept the identifier 250 received from the email application 222 over any copy stored on the email service 202.

As one example of the identifier 250, the identifier 250 may be a bottom timestamp. The bottom timestamp may include a specific date and time. The email application 222 may not store email messages older than the specific date and time. The specific date and time may be equal to a timestamp of an oldest email message stored on the email application 222. Assume for example the email message 244e is the oldest email message stored on the client device 220. Assume the specific date and time included in the identifier 250 is equal to the timestamp 246e. When the identifier 250 is a specific data and time, the email application 222 may store email messages with a timestamp from the identifier 250 to the most recent time the email application 222 received email messages from the email service 202. When the email application 222 requests messages and updates from the email service 202, the email application 222 may request new messages and updates from the identifier 250 to the present time. The email application 222 may delete locally stored messages that have a timestamp older then the identifier 250. The email application 222 may change the value of the identifier 250 each time it requests new messages and/or updates from the email service 202. The email service 202 may determine from the identifier 250 that the email service 202 should provide new messages and updates for messages with a timestamp equal to or more recent than the identifier 250.

As another example, the identifier 250 may be a synchronization window. The synchronization window may represent a time period. The email application 222 may request and store all email messages having a timestamp within the time period. The email application 222 may request new messages and updates for messages having a timestamp within the time period. The email application 222 may delete messages stored locally that fall outside the time period.

As another example, the identifier 250 may be a specific number "X." When the identifier 250 is a specific number, the email application 222 may store the most recent X email messages present on that the email service 202 had the last time the email application 222 requested email messages. When the email application 222 requests messages and updates from the email service 202, the email application 222 may request new messages and updates for the most recent X email messages that the email service 202 has at that time. The email application 222 may delete from the client device 220 any locally stored email messages that do not fall within the most recent X email messages that the email service 202 has at the time the email application 222 requests new messages and updates.

The email application 222 may provide the identifier 250 to the email service 202 as part of requesting the remote unread count 232 or updates to the remote unread count 232. For example, the email application 222 may provide the identifier 250 to the email service 202, and the email service 202 may use the identifier 250 to determine that email messages 238a-e are stored on the client device 220. The email service 202 may determine how many of the email messages 238f-h are marked as unread and return that number as the remote unread count 232. Alternatively, the email service 202 may determine how many of the email messages 238a-e are marked as unread, subtract that number from the service unread count 212, and return that number as the remote unread count 232. The email application 222 may also provide the identifier 250 to the email service 250 as part of requesting new messages and other updates with the email service 202.

The email service 202 may use the identifier 250 in determining whether the email service 202 should provide updates to the remote unread count 232. For example, when the read status 242c of the email message 238c changes, the email service 202 may use the identifier 250 that the email service 202 most recently received from the email application 222 to determine whether the email message 238c is stored on the client device 220. If initially the email service 202 determines that the email message 238c is not stored on the client device, then the email service 202 may provide an update to the remote unread count 232 to the email application 222. In the alternative, if the email service 202 determines that the email message 238c is stored on the client device (as is shown in FIG. 2), then the email service 202 may not provide an update to the remote unread count 232 to the email application 222. Instead, the email service 202 may provide the read status 242c (which has changed since the last time the email service 202 synchronized new messages and other updates with the email application 222) to the email application 222 the next time the email application 222 requests or receives messages and/or updates from the email service 202. At that time, to the extent the read status 242c is different from the read status 248c, the change may be reflected in the local unread count 230. If at the time of that synchronization the identifier 250 received by the email service 202 causes the email message 238c to no longer be stored on the client device 220, the email service 202 may update the remote unread count 232 provided to the email application 222. As another example, assume the identifier 250 is a bottom timestamp. If the email service 202 receives a new unread message, the email service 202 may provide updates to the remote unread count 232 if the new message is older than the bottom timestamp. If the new unread message is more recent than the bottom timestamp, the email service 202 may not provide an update to the remote unread count 232. Instead, the email service 202 may provide the new unread message when the email application 222 next requests new messages. The email application 222 may update the local unread count 230 based on receiving the new unread message.

The email application 222 may request messages beyond those that fall within the identifier 250. For example, the email application 222 may request the next 10 most recent messages that come after email messages stored on the client device 220. In that case, the email application 222 may update the identifier 250 based on the messages the email application 222 receives from the email service 202. The email service 202 may determine an updated identifier based on the messages the email service 202 provides to the email application 222. The email service 202 may use the updated identifier in determining whether a change to a read status of an email message should be provided to the email application 222 (i.e., the email service 202 may use the updated identifier in determining whether the email message is stored on the email application 222 or not). The email service 202 may update the value of the identifier the next time the email service receives the identifier 250 from the email application 222.

Figure 3:
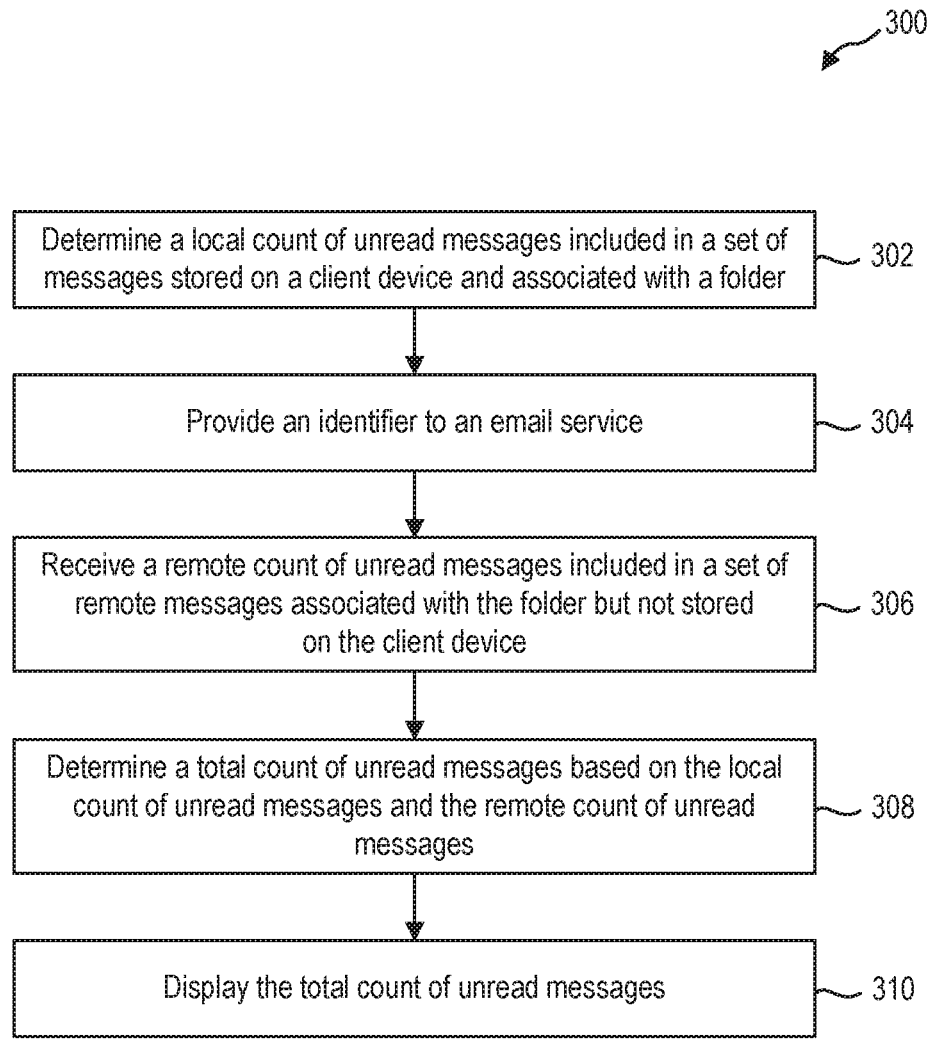
FIG. 3 illustrates an example of a potential method for determining a total count of unread messages.

FIG. 3 illustrates one potential example of a method 300 for determining a total count of unread messages.

The method 300 may include determining 302 a local count of unread messages included in a set of messages that are stored on a client device and that are associated with a folder. The set of messages may be managed by an email application (such as the email application 122 or the email application 222). Each message in the set of messages may be marked as read or unread. The local count of unread messages may be the number of messages included in the set of messages that are marked as unread. The email application may update the local count of unread messages based on changes to the read status of messages included in the set of messages. Changes to the read status of messages included in the set of messages may result from user activity on the email application or from updates received from the email service.

The method 300 may include providing 304 an identifier to an email service. The identifier may be the identifier 250, and the email service may be the email service 102 or the email service 202. The email service may have messages corresponding to the set of messages stored on the client device. The email service may have additional messages associated with the folder that are not stored on the client device. The identifier may include information that the email service uses to determine which of the messages stored on the email service and associated with the folder are also stored on the client device.

The method 300 may include receiving 306 a remote count of unread messages included in a set of remote messages stored on the email service but not the client device. The email service may use the identifier to identify the set of remote messages. The email service may determine the remote count and provide the remote count to the client device. The email service may determine the remote count by counting how many messages in the set of remote messages are marked as unread. The email service may provide updates to the remote count of unread messages based on changes to the read status of messages included in the set of remote messages.

The method 300 may include determining 308 a total count of unread messages based on the local count of unread messages and the remote count of unread messages. The email application may determine the total count of unread messages by adding the local count of unread messages to the remote count of unread messages. The email application may update the total count of unread messages based on changes to the local count of unread messages. The email application may update the total count of unread messages based on updates to the remote count of unread messages.

The method 300 may include displaying 310 the total count of unread messages. The email application may cause the total count of unread messages to be displayed on a display screen of the client device.

Figure 4:
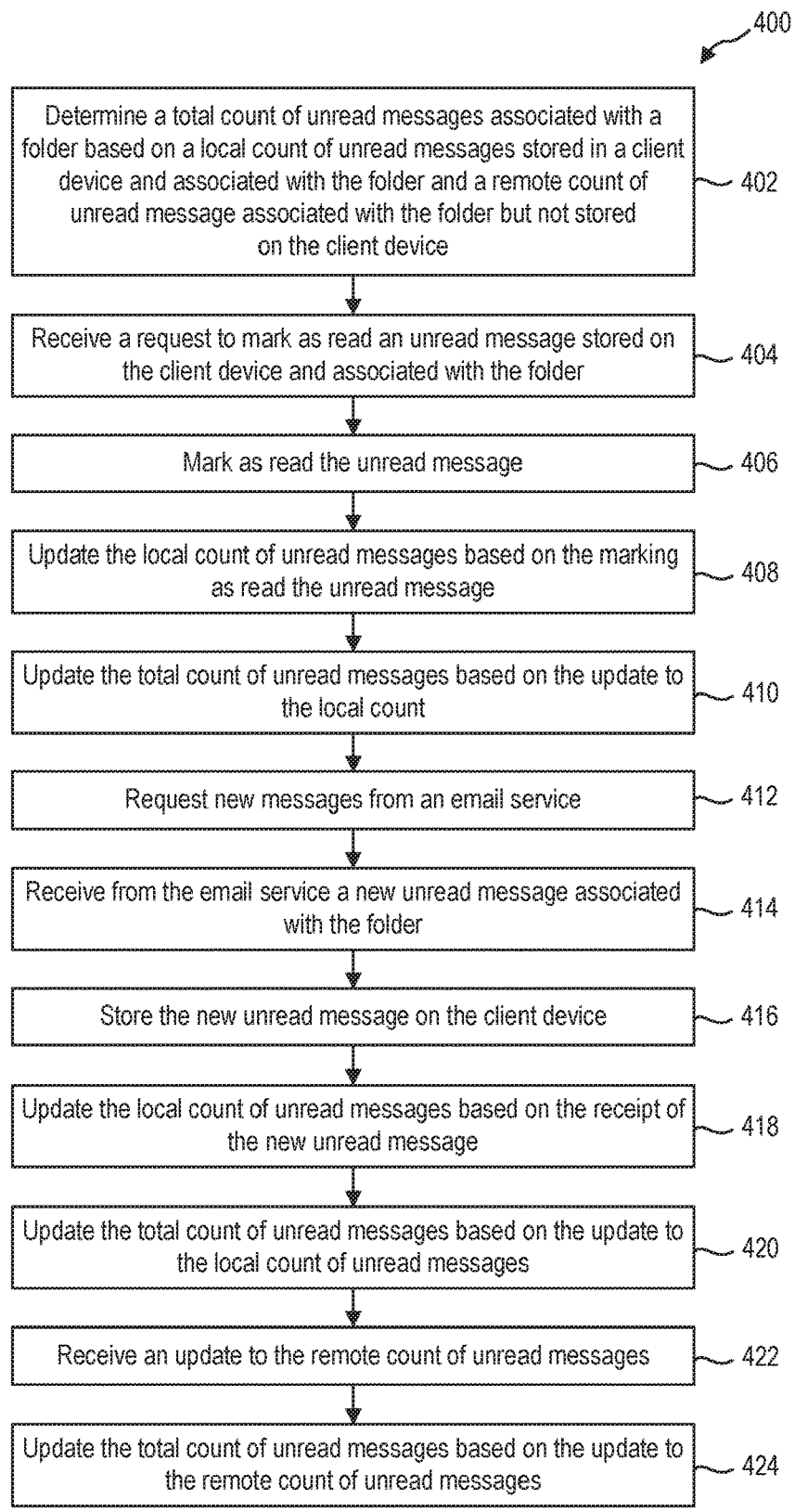
FIG. 4 illustrates an example of a potential method for updating a total count of unread messages.

FIG. 4 illustrates one potential example of a method 400 for updating a total count of unread messages.

The method 400 may include determining 402 a total count of unread messages associated with a folder based on a local count of unread messages stored on a client device and associated with the folder and a remote count of unread messages associated with the folder but not stored on the client device. The total count of unread messages may be stored in an email application on the client device. The unread messages associated with the folder but not stored on the client device may be stored on an email service.

The method 400 may include receiving 404 a request to mark as read an unread message stored on the client device and associated with the folder. The email application may receive the request. The request may result from activity of a user. The request may result from the user viewing the unread message using the email application. The request may result from the user viewing the unread message using a second client device. The second client device may provide an updated read status for the unread message to the email service, and the email service may provide the updated read status for the unread message to the client device. The request may result from the user viewing the unread message using a web interface. The email service may change the read status of the unread message and provide the updated read status for the unread message to the client device.

The method 400 may include marking 406 as read the unread message. The email application may mark the unread message as read.

The method 400 may include updating 408 the local count of unread messages based on the marking as read the unread message. The email application may update the local count of unread messages. Updating 408 the local count of unread messages may include the email application decreasing the local count of unread messages by one.

The method 400 may include updating 410 the total count of unread messages based on the update to the local count. The email application may update the total count of unread messages. Updating 410 the total count of unread messages based on the update to the local count may include the email application decreasing the total count of unread messages by one. Updating 410 the total count of unread messages may include the email application adding the local count of unread messages to the remote count of unread messages.

The method 400 may include requesting 412 new messages from an email service. The email application may request new messages from the email service. The email application may request new messages from the email service periodically or based on user activity (such as opening the email application or requesting that the email application obtain new messages). The email application may provide an identifier with the request. The email service may use the identifier to determine what messages to provide to the email application. The new message may have been received by the email service since the most recent time the email application requested new messages from the email service. The new message may have been received by the email service before the most recent time the email application requested new messages from the email service. The email service may not have provided the new message previously based on the identifier.

The method 400 may include receiving 414 from the email service a new unread message associated with the folder. The email application may receive the new unread message.

The method 400 may include storing 416 the new unread message on the client device. The email application may store the new unread message and associate it with the folder.

The method 400 may include updating 418 the local count of unread messages based on the receipt of the new unread message. The email application may update the local count. The email application may increase the local count by one based on the receipt of the new unread message.

The method 400 may include updating 420 the total count of unread messages based on the update to the local count of unread messages. The email application may update the total count. The email application may increase the total count by one based on the update to the local count of unread messages.

The method 400 may include receiving 422 an update to the remote count of unread messages. The email application may receive the update to the remote count of unread messages from the email service. The email service may provide the update based on one or more changes to the read status of messages stored on the email service but not on the client device. For example, a user may have used a web interface to view a message stored on the email service but not on the client device. The email service may provide the update based on receiving a new message that would not be provided to the email application based on the current identifier known to the email service.

The method 400 may include updating 424 the total count of unread messages based on the update to the remote count of unread messages. The email application may update the total count.

Figure 5:
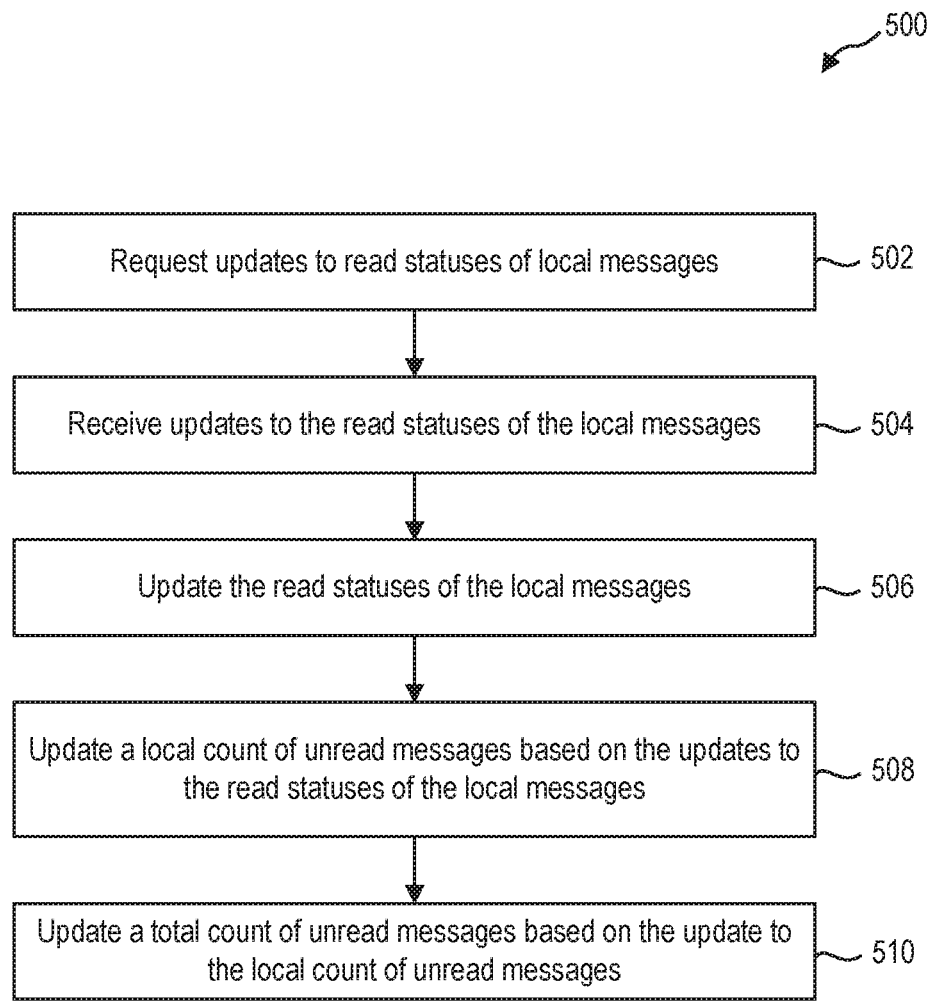
FIG. 5 illustrates an example of a potential method for updating a total count of unread messages based on updates to read status of local messages.

FIG. 5 illustrates one potential example of a method 500 for updating a total count of unread messages based on updates to read status of local messages.

The method 500 may include requesting 502 updates to read statuses of local messages. An email application stored on a client device may request the updates to the read statuses of local messages. The email application may request the updates from an email service. Copies of the local messages may be stored in the email application. The copies of the local messages stored in the email application may each have a read status that is either "read" or "unread." Copies of the local messages may also be stored on the email service. The copies of the local messages stored on the email service may each have a read status that is either "read" or "unread." The email service may also store remote messages. The email application may not store copies of the remote messages.

A user may be able to cause the read status of a copy of a local message stored on the email service to be changed by viewing the local message using a web interface or by requesting that the read status of the local message be changed using the web interface. A user may also be able to cause the read status of a copy of a local message stored on the email service to be changed by viewing a second copy of the local message using another client device or by requesting that the another client device change the read status of the second copy of the local message. The another client device may provide an update on the read status of the second copy of the local message to the email service. The email service may then update the read status of the copy of the local message stored on the email service.

The email application may provide an identifier (such as the identifier 250) when requesting updates to the read statuses of the local messages. The email service may use the identifier to identify the local messages that are stored on the email service.

The method 500 may include receiving 504 updates to read statuses of local messages. The email service may provide updates to the read statuses of the local messages to the email application. The updates may indicate changes to the read statuses of the local messages since the last time the email application received updates to read statuses of local messages. In the alternative, the updates may include all the current read statuses of the local messages whether the read statuses have changed since the last time the email application received updates to the read statuses of the local messages. Receiving 504 the updates to the read statuses of the local messages may not include read statuses of or updates to the read statuses of the remote messages.

The method 500 may include updating 506 the read statuses of the local messages. The email application may update the read statuses of the local messages stored on the email application based on the updates to the read statuses of the local messages received from the email service. For example, a first local message stored on the email application may have an "unread" status. The updates to the read statuses of the local messages received from the email service may indicate that the first local message has a "read" status on the email service. The email application may change the read status of the first local message to be "read" based on the updates received from the email service.

The method 500 may include updating 508 a local count of unread messages based on the updates to the read statuses of the local messages. The email application may update the local count of unread messages. The local count of unread messages may indicate how many messages stored on the email application have a read status of "unread." The updates to the read statuses of the local messages received from the email service may indicate that one or more local messages stored on the email application that have a read status of "unread" now have a read status of "read." The number of messages stored on the email application that have a read status of "unread" may therefore be different after the email application updates the read statuses of the one or more local messages.

The method 500 may include updating 510 a total count of unread messages based on the update to the local count of unread messages. The email application may update the total count of unread messages. The total count of unread messages may be a sum of the number of messages stored on the client device that have a read status of "unread" and the number of messages stored on the email service but not the client device that have a read status of "unread."

Figure 6:
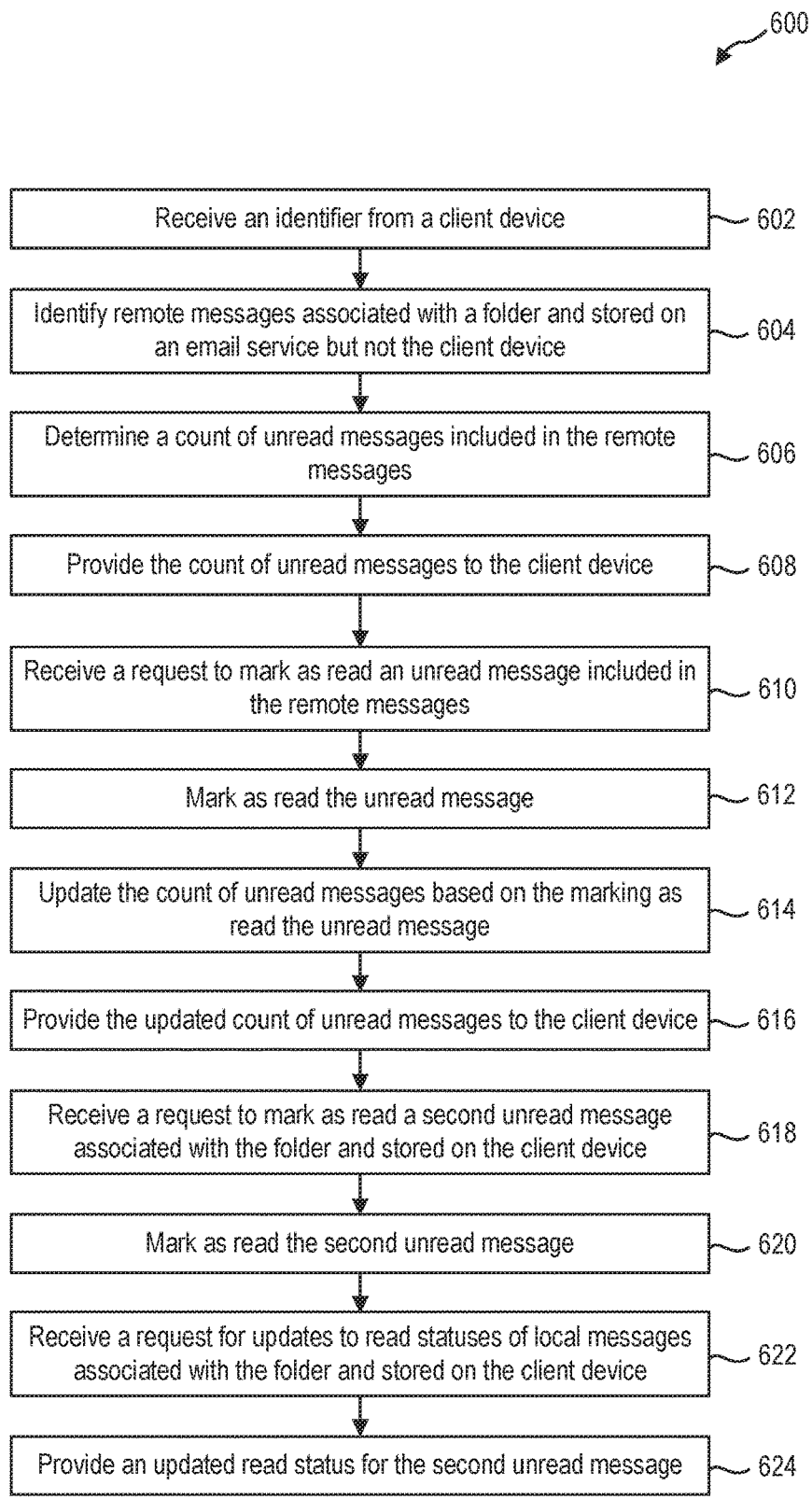
FIG. 6 illustrates an example of a potential method for providing a count of unread messages included in remote messages.

FIG. 6 illustrates one potential example of a method 600 for providing a count of unread messages included in remote messages.

The method 600 may include receiving 602 an identifier from a client device. The identifier may be the identifier 250. The client device may store the identifier. An email service may receive the identifier and store the identifier.

The method 600 may include identifying 604 remote messages associated with a folder and stored on an email service but not the client device. The email service may include messages that are also stored on the client device. The email service may identify the remote messages using the identifier.

The method 600 may include determining 606 a count of unread messages included in the remote messages. The email service may determine the count of unread messages included in the remote messages.

The method 600 may include providing 608 the count of unread messages to the client device. The email service may provide the count of unread messages to the client device. The email service may provide the count of unread messages to the client device in response to a request from the client device. The email service may also provide the count of unread messages to the client device without receiving a request from the client device.

The method 600 may include receiving 610 a request to mark as read an unread message included in the remote messages. The email service may receive the request. The request to mark as read the unread message may result from a user viewing the unread message using a web interface. The request to mark as read the unread message may result from the user viewing a copy of the unread message stored on a second client device using the second client device. The second client device may notify the email service that the unread message has been viewed on the second client device.

The method 600 may include marking 612 as read the unread message. The email service may mark the unread message stored on the email service as read.

The method 600 may include updating 614 the count of unread messages based on the marking as read the unread message. The email service may update the count of unread messages. The email service may reduce the count of unread messages by one based on the marking as read the unread message.

The method 600 may include providing 616 the updated count of unread messages to the client device. The email service may provide the updated count of unread messages to the client device. The email service may provide the updated count of unread messages to the client device as a notification and without waiting for a request from the client device.

The method 600 may include receiving 618 a request to mark as read a second unread message associated with the folder and stored on the client device. The email service may receive the request. The request to mark as read the second unread message may result from a user viewing the second unread message using a web interface. The request to mark as read the second unread message may result from the user viewing a copy of the second unread message stored on a second client device using the second client device. The second client device may notify the email service that the second unread message has been viewed on the second client device.

The method 600 may include marking 620 as read the second unread message. The email service may mark the second unread message as read.

The method 600 may include receiving 622 a request for updates to read statuses of local messages associated with the folder and stored on the client device. The email service may receive the request from the client device.

The method 600 may include providing 624 an updated read status for the second unread message. The email service may provide the updated read status for the second unread message to the client device. The email service may provide the updated read status in response to the request. The email service may not provide the updated read status except in response to receiving the request from the client device.

Figure 7:
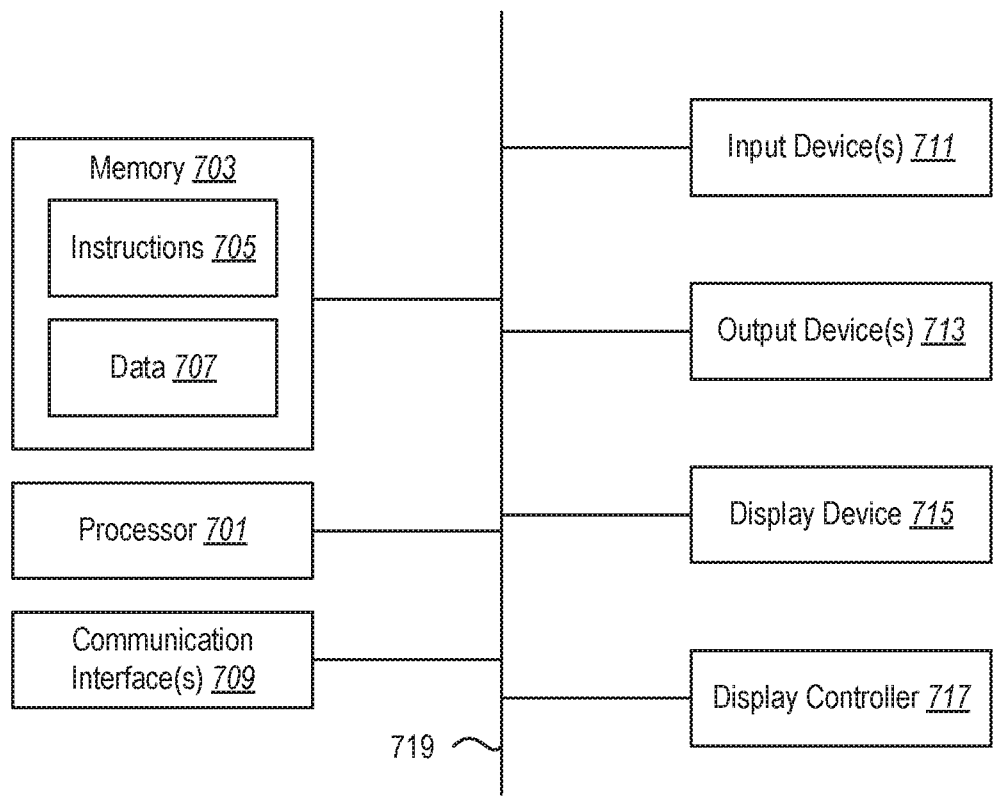
FIG. 7 illustrates components that may be included in a computer system.

FIG. 7 illustrates certain components that may be included within a computer system 700. One or more computer systems 700 may be used to implement the various devices, components, and systems described herein. For example, the client device 120 may be implemented using the computer system 700.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information (such as the email application 122, the unread messages 126a, the read messages 128a, or the email messages 244). For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules, components, packages, applications, and operating systems described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A non-transitory computer-readable medium comprising instructions that are executable by one or more processors to cause a computing system to:
   determine a local count of local unread messages, wherein at least a portion of each of the local unread messages is stored on a client device and wherein the local count of local unread messages is determined at the client device;
   provide, from the client device to a remote service separate from the client device, an identifier, wherein the identifier is a synchronization window and the client device stores messages having a timestamp within the synchronization window and does not store messages having a timestamp outside the synchronization window;

receive, at the client device from the remote service, a remote count of remote unread messages, wherein the remote unread messages and the local unread messages are stored on the remote service, wherein the remote unread messages are not stored on the client device, and wherein the identifier is used by the remote service to distinguish between the remote unread messages and the local unread messages in determining the remote count of remote unread messages that the client device receives;

calculate a total count of unread messages by adding the local count to the remote count, wherein the total count of unread messages is calculated at the client device; and enable display of the total count of unread messages on a display screen of the client device.

2. The non-transitory computer-readable medium of claim 1, wherein the remote service is an email service.

3. The non-transitory computer-readable medium of claim 1, wherein the identifier is stored by the remote service and is used by the remote service to determine whether to provide an update regarding the remote count to the client device.

4. The non-transitory computer-readable medium of claim 2, further comprising additional instructions that are executable by the one or more processors to cause the computing system to:

request from the remote service new messages;
receive a new message from the remote service, wherein the new message is marked as unread; and
update the local count of local unread messages based on receiving the new message.

5. The non-transitory computer-readable medium of claim 2, further comprising additional instructions that are executable by the one or more processors to cause the computing system to:

request from the remote service status update information for the local unread messages, wherein the local unread messages stored on the client device include a first message and the remote service includes the local unread messages and the first message;
receive from the remote service the status update information for the local unread messages, wherein the status update information states that the first message is marked as read on the remote service;
mark as read the first message; and
update the local count of local unread messages based on marking the first message as read.

6. The non-transitory computer-readable medium of claim 2, further comprising additional instructions that are executable by the one or more processors to cause the computing system to:

receive an update to the remote count of remote unread messages; and
update the total count of unread messages based on the update.

7. The non-transitory computer-readable medium of claim 6, wherein the update to the remote count of remote unread messages results from a request to the remote service to mark as read a first message included in the remote unread messages.

8. The non-transitory computer-readable medium of claim 1, further comprising additional instructions that are executable by the one or more processors to cause the computing system to:

receive a request to mark as read a first message included in the local unread messages; and update the local count of local unread messages and the total count of unread messages based on the request.

9. The non-transitory computer-readable medium of claim 1, wherein the local unread messages are associated with a folder and the remote unread messages are associated with the folder.

10. A non-transitory computer-readable medium comprising instructions that are executable by one or more processors to cause a computing system to:

determine a local count of unread messages included in local messages, wherein at least a portion of each of the local messages are stored on a client device and wherein the local count of local unread messages is determined at the client device;
provide, to a service separate from the client device, an identifier, wherein the identifier is a synchronization window and the client device stores messages having a timestamp within the synchronization window and does not store messages having a timestamp outside the synchronization window;
receive, from the service, a remote count of unread messages included in remote messages, wherein the service includes the local messages and the remote messages, the client device does not include the remote messages, the local messages and the remote messages are associated with a folder, and the service uses the identifier to identify the remote messages in determining the remote count of unread messages;
calculate, at the client device, a total count of unread messages by adding the local count to the remote count; and
enable display of the total count of unread messages on a display screen of the client device.

11. The non-transitory computer-readable medium of claim 10, wherein the folder is an inbox.

12. The non-transitory computer-readable medium of claim 10, wherein the remote messages fall outside the synchronization window and the local messages fall within the synchronization window.

13. The non-transitory computer-readable medium of claim 10, further comprising additional instructions that are executable by the one or more processors to cause the computing system to:

receive a request to change a read/unread status of a first message included in the local messages;
change the read/unread status of the first message; and
update the local count of unread messages and the total count of unread messages based on the change to the read/unread status of the first message.

14. A method for providing a count of unread remote messages, comprising:

storing, at a remote service, a set of messages associated with a folder, wherein each message in the set of messages includes a read/unread status;
identifying, at the remote service from among the set of messages, a set of remote messages, wherein one or more messages in the set of messages are stored on a client device and the set of remote messages are not stored on the client device, wherein the remote service uses an identifier received from the client device in identifying the set of remote messages, and wherein the identifier is a synchronization window and the client device stores messages having a timestamp within the synchronization window and does not store messages having a timestamp outside the synchronization window;

determining, at the remote service, the count of unread remote messages, wherein the count of unread remote messages is a number of messages in the set of remote messages that have a read/unread status of unread; and providing, to the client device from the remote service, the count of unread remote messages.

15. The method of claim 14, further comprising:
receiving a request to change a first read/unread status of a first message included in the set of messages;

determining, using the identifier, that the first message is included in the set of remote messages;

determining, after determining that the first message is included in the set of remote messages, an updated count of unread remote messages based on the request; and providing the updated count of unread remote messages to the client device.

16. The method of claim 14, further comprising:
receiving, from the client device at the remote service, a request for one or more messages included in the set of remote messages; and determining an updated identifier based on the request for the one or more messages.

17. The method of claim 14, further comprising:
receiving, at the remote service from the client device, an updated identifier;

identifying, using the updated identifier, an updated set of remote messages;

determining, after identifying the updated set of remote messages and at the remote service, an updated count of unread remote messages; and providing the updated count of unread remote messages to the client device.

* * * * *